United States Patent
Aigner et al.

(10) Patent No.: US 11,460,102 B2
(45) Date of Patent: Oct. 4, 2022

(54) ASSEMBLY OF AN AXLE OR A SHAFT ON A COMPONENT, IN PARTICULAR FOR A VEHICLE, AND VEHICLE COMPRISING SUCH AN ASSEMBLY

(71) Applicant: Bayerische Motoren Werke Aktiengesellschaft, Munich (DE)

(72) Inventors: Johann Aigner, Fuerstenzell (DE); Michael Staake, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/509,182

(22) Filed: Jul. 11, 2019

(65) Prior Publication Data

US 2019/0331213 A1 Oct. 31, 2019

Related U.S. Application Data

(63) Continuation of application No. PCT/EP2018/050851, filed on Jan. 15, 2018.

(30) Foreign Application Priority Data

Jan. 24, 2017 (DE) .................. 10 2017 201 116.5

(51) Int. Cl.
*F16H 1/28* (2006.01)
*F16H 57/08* (2006.01)
(Continued)

(52) U.S. Cl.
CPC ......... *F16H 57/082* (2013.01); *B60B 35/125* (2013.01); *F16B 17/006* (2013.01);
(Continued)

(58) Field of Classification Search
CPC ............... F16H 57/082; F16H 57/0018; F16H 2057/005; F16H 57/023; F16B 17/006
(Continued)

(56) References Cited

U.S. PATENT DOCUMENTS 3,872,578 A   3/1975 Ullom
4,043,021 A * 8/1977 Mosbacher ........... F16H 57/082
                                                29/437

(Continued)

FOREIGN PATENT DOCUMENTS

CN   101468435 A   7/2009
CN   101528383 A   9/2009
(Continued)

OTHER PUBLICATIONS

English translation of JP2005148285A; http://translationportal.epo.org; Aug. 31, 2020 (Year: 2020).*
(Continued)

*Primary Examiner* — Roger L Pang
(74) *Attorney, Agent, or Firm* — Crowell & Moring LLP

(57) ABSTRACT

An assembly of a first component designed as an axle or a shaft on a second component, is provided, in particular for a vehicle. The first component is secured to the second component at least in the axial direction of the first component. At least one of the components has at least one first deformation on one side, the deformation being used to secure the first component on the second component in a first direction which coincides with the axial direction. At least one of the components has at least one second deformation on the same side, the second deformation being used to secure the first component on the second component in a second direction which coincides with the axial direction and is opposite the first direction.

6 Claims, 2 Drawing Sheets

(51) Int. Cl.
 *B60B 35/12* (2006.01)
 *F16B 17/00* (2006.01)
 *F16H 57/00* (2012.01)
 *F16H 57/023* (2012.01)

(52) U.S. Cl.
 CPC ........... *F16H 1/28* (2013.01); *F16H 57/0018* (2013.01); *F16H 57/023* (2013.01); *F16H 2057/005* (2013.01)

(58) Field of Classification Search
 USPC ....................................................... 475/331
 See application file for complete search history.

(56) References Cited

U.S. PATENT DOCUMENTS

| | | | |
|---|---|---|---|
| 4,376,333 | A | 3/1983 | Kanamaru et al. |
| 4,574,448 | A | 3/1986 | Brandenstein et al. |
| 5,579,568 | A * | 12/1996 | Hudson ............... B21J 15/02 29/509 |
| 6,276,838 | B1 | 8/2001 | Lauk et al. |
| 6,651,336 | B1 * | 11/2003 | Bauknecht ........... F16H 57/082 29/893 |
| 7,537,224 | B2 | 5/2009 | Morris et al. |
| 2003/0175074 | A1 | 9/2003 | Humpert et al. |
| 2006/0112531 | A1 * | 6/2006 | Skrabs ................. F16H 57/082 29/428 |
| 2009/0165297 | A1 | 7/2009 | Mataga et al. |
| 2010/0313408 | A1 | 12/2010 | Morlo |
| 2015/0273940 | A1 * | 10/2015 | Forrest .................... F16H 1/46 475/300 |
| 2019/0331212 | A1 * | 10/2019 | Simon .................. F16H 57/082 |

FOREIGN PATENT DOCUMENTS

| | | |
|---|---|---|
| DE | 83 21 186 U1 | 4/1987 |
| DE | 197 55 091 A1 | 6/1999 |
| DE | 10 2008 064 426 A1 | 7/2009 |
| DE | 10 2011 006 285 A1 | 10/2012 |
| DE | 10 2015 006 353 A1 | 8/2016 |
| EP | 1 335 141 A1 | 8/2003 |
| EP | 1 837 535 A1 | 9/2007 |
| GB | 2 029 300 A | 3/1980 |
| JP | 2005147285 A * | 6/2005 |
| WO | WO 2007/044928 A1 | 4/2007 |
| WO | WO 2008/049731 A1 | 5/2008 |

OTHER PUBLICATIONS

International Search Report (PCT/ISA/210) issued in PCT Application No. PCT/EP2018/050851 dated Mar. 23, 2018 with English translation (seven (7) pages).

German-language Written Opinion (PCT/ISA/237) issued in PCT Application No. PCT/EP2018/050851 dated Mar. 23, 2018 (five (5) pages).

German-language Search Report issued in counterpart German Application No. 10 2017 201 116.5 dated Oct. 11, 2017 with partial English translation (13 pages).

Chinese-language Office Action issued in Chinese Application No. 201880004681.5 dated Apr. 20, 2020 with English translation (13 pages).

* cited by examiner

ASSEMBLY OF AN AXLE OR A SHAFT ON A COMPONENT, IN PARTICULAR FOR A VEHICLE, AND VEHICLE COMPRISING SUCH AN ASSEMBLY

CROSS REFERENCE TO RELATED APPLICATIONS

This application is a continuation of PCT International Application No. PCT/EP2018/050851, filed Jan. 15, 2018, which claims priority under 35 U.S.C. § 119 from German Patent Application No. 10 2017 201 116.5, filed Jan. 24, 2017, the entire disclosures of which are herein expressly incorporated by reference.

BACKGROUND AND SUMMARY OF THE INVENTION

The invention relates to an assembly of a first component designed as an axle or shaft on a second component, in particular for a vehicle. The invention also relates to a vehicle comprising at least one such assembly.

Such assemblies of first components designed as axles or shafts on respective second components, and also vehicles comprising such assemblies, are already well known from the general prior art and, in particular, from series production of vehicles. In such an assembly the first component which is designed as an axle or shaft is secured on the second component at least in the axial direction of the first component, and therefore at least relative movements between the component in the axial direction of the first component, that is to say in the axial direction of the axle or of the shaft, are avoided. This means, for example, that the first component cannot be displaced along its axial direction relative to the second component, or vice versa.

It is the object of the present invention to develop an assembly and a vehicle of the type mentioned at the beginning in such a manner that the assembly or the vehicle can be produced particularly simply and therefore particularly cost-effectively.

A first aspect of the invention relates to an assembly of a first component designed as an axle or shaft on a second component, in particular for a vehicle, such as, for example, for a motor vehicle. The assembly is advantageously used in a drive train of a vehicle which is drivable by means of the drive train. In the assembly, the first component is secured in the second component at least in the axial direction of the first component. As a result, at least relative movements between the components in the axial direction of the first component, that is to say in the axial direction of the shaft or of the axle, can be avoided, and therefore, for example, the first component cannot be displaced in the axial direction of the first component relative to the second component, or vice versa.

In order now to be able to produce the assembly particularly simply and therefore particularly cost-effectively, it is provided according to the invention that at least one of the components have, on one side, in particular an axial side, at least one first deformation by means of which the first component is secured to the second component in a first direction coinciding with the axial direction of the first component. In other words, the at least one component is deformed on said side, in particular the axial side, in particular in at least one first region or at at least one first location. Therefore, the at least one component has the at least one deformation on the side. Since the first component is secured to a second component by the first deformation in the first direction which coincides with the axial direction or runs parallel to the axial direction, the first component cannot be displaced relative to the second component in the first direction, or vice versa.

Furthermore, it is provided according to the invention that at least one of the components has, on the same side, in particular the axial side, at least one second deformation by which the first component is secured on the second component in a second direction which coincides with the axial direction and is opposed to the first direction. In other words, the at least one component is deformed on the same, in particular axial, side, in particular in at least one second region or at a second location. Therefore, the at least one component has the at least one second deformation on said side. By means of the second deformation, the first component is secured on the second component in the second direction, which coincides with the axial direction of the first component or runs parallel to the axial direction of the first component, and therefore relative displacements between the components can also be avoided in the second direction. The first component therefore cannot be displaced relative to the second component in the second direction opposed to the first direction, or vice versa.

Since the first deformation and the second deformation are arranged on the same, in particular axial, side, the deformations can be produced particularly simply and therefore particularly rapidly and cost-effectively, and therefore the assembly as a whole can be produced particularly simply and therefore rapidly and cost-effectively. As previously mentioned, the side on which the two deformations are arranged is, for example, an axial side. This should be understood as meaning that the side faces or is directed, for example, in the axial direction of the first component, and therefore, for example, the side or the respective deformation runs or is arranged in a plane which runs obliquely or preferably perpendicularly to the axial direction of the first component.

The invention is based on the finding that the first component, such as, for example, axles and shafts, can be secured in the axial direction on respective second components, for example with the aid of securing elements, such as, for example, securing rings, which are formed separately from the components and are used in addition to the components. Alternatively or additionally, stop surfaces, such as, for example, shaft or axle stops, securing nuts and/or other elements can be used in order to axially secure the first component on a second component, or vice versa. The additional securing elements, such as, for example, securing rings and securing nuts, lead to a high number of parts and therefore to a high weight and to high costs. Furthermore, such additional, separate securing elements lead to an increased outlay on installation, from which an increased requirement in terms of time and costs likewise result. If, for example, the axial securing takes place with the aid of stop surfaces or shaft or axle stops, a corresponding, complicated and therefore time- and cost-intensive machining of the axle or shaft or of the second component is required, from which high costs can likewise result. These problems and disadvantages can be avoided in the assembly according to the invention since the first component is secured both in the first direction and in the second direction by means of the deformations on the second component, rather than by means of additional securing elements.

Furthermore, it is basically conceivable to arrange the first deformation, for example, on a first side and the second deformation on a second side lying opposite the first side in the axial direction. For example, the second component is pressed onto the first component, or the first component is pressed into the second component. This type of axial securing likewise leads to high costs since the assembly or the production of the deformations on the opposite sides in the axial direction is highly complicated. Furthermore, it is conceivable to press one of the components against a stop of the other component and to deform same only on one side and here on a side lying opposite the stop in order to realize the axial securing. The deformation is produced here, for example, via a round or elongated punch by means of which a region is deformed. The region to be deformed is not hardened or soft annealed again during a subsequent heat treatment. However, this type of axial securing also leads to increased costs since the pressing and the stop mentioned are required. These problems and disadvantages can likewise be avoided in the assembly according to the invention, and therefore the assembly according to the invention permits particularly simple and therefore rapid and cost-effective axial securing.

In order to realize particularly fixed axial securing, the respective other component, for example, has at least one recess in which the deformation or a region of the at least one component or of the at least one component that has been deformed by the deformation, is at least partially, in particular at least predominantly, accommodated. As a result, the components interact, for example, in a force-fitting and/or form-fitting manner, and therefore the components are secured or fixed on each other in the axial direction. By contrast to an arrangement of respective deformations on both sides, in order to produce the assembly according to the invention use can be made of a particularly simple and therefore cost-effective device which deforms the respective component only on the side mentioned. As a result, for example, the use of precisely one actuator which is designed, for example, as a pneumatic cylinder, suffices in order to produce the deformations on the same side. Furthermore, particularly simple machining of the components can be realized since no axle stops or shaft stops and no stops, in particular housing stops, are provided and required for the axial securing.

In a particularly advantageous refinement, the at least one component and the at least one component are the same component. In other words, the same component has, on the side mentioned, both the first deformation and the second deformation, and therefore the assembly can be produced particularly rapidly and cost-effectively.

In order to realize particularly fixed axial securing, it is provided, in a further embodiment of the invention, that the at least one component has a plurality of first deformations by which the first component is secured on the second component in the first direction, wherein the first deformations are arranged consecutively or one behind another in the circumferential direction of the first component.

It has been shown as being furthermore particularly advantageous if the at least one component has a plurality of second deformations by which the first component is secured to the second component in the second direction, wherein the second deformations are arranged consecutively or one behind another in the circumferential direction of the first component. As a result, the components can be fixed particularly securely to one another.

In a further advantageous refinement of the invention, the plurality of deformations, that is to say the plurality of first deformations and/or the plurality of second deformations, are arranged distributed uniformly in the circumferential direction of the first component, in particular over the circumference thereof. By this means, for example, local loading or load peaks can be avoided, and therefore the components can be secured particularly fixedly to one another.

The at least one component and/or the at least one component is preferably the second component. In other words, it is preferably provided that the second component has the at least one first deformation and the at least one second deformation, as a result of which the cost can be kept particularly low. This embodiment is based on the concept that—since the first component is designed as a shaft or axle—the second component is customarily designed as a housing or a housing element on which the first component is secured in its axial direction. The second component can customarily be deformed more simply and cost-effectively than the first component.

In a particularly advantageous embodiment of the invention, the first component is designed as an axle on which a planetary gear of a planetary gearing is rotatably mounted. It has been found that, in particular in the case of such a planetary gearing, the costs can be significantly reduced in comparison to conventional planetary gearings by the axial securing according to the invention being used.

It has been shown to be particularly advantageous here if the second component is designed as a planetary carrier or as a web of the planetary carrier.

A second aspect of the invention relates to a vehicle which is preferably designed as a motor vehicle and in particular as an automobile, such as, for example, a passenger car. The vehicle according to the invention has at least one assembly of a first component designed as an axle or shaft on a second component, wherein the assembly is preferably designed as an assembly according to the invention of the first aspect of the invention. In the assembly, the first component is secured on the second component at least in the axial direction of the first component.

In order now to keep the costs of the vehicle particularly low, it is provided according to the invention in the case of the second aspect that at least one of the components has, on one side, at least one first deformation by which the first component is secured in a first direction coinciding with the axial direction and on a second component, or vice versa. Furthermore, it is provided according to the invention that at least one of the components has, on the same side, at least one second deformation by which the first component is secured on the second component in a second direction which coincides with the axial direction and is opposed to the first direction, or vice versa. Advantages and advantageous refinements of the first aspect of the invention should be considered as advantages and advantageous refinements of the second aspect of the invention, and vice versa.

Other objects, advantages and novel features of the present invention will become apparent from the following detailed description of one or more preferred embodiments when considered in conjunction with the accompanying drawing.

DETAILED DESCRIPTION OF THE DRAWINGS

Figure 1:
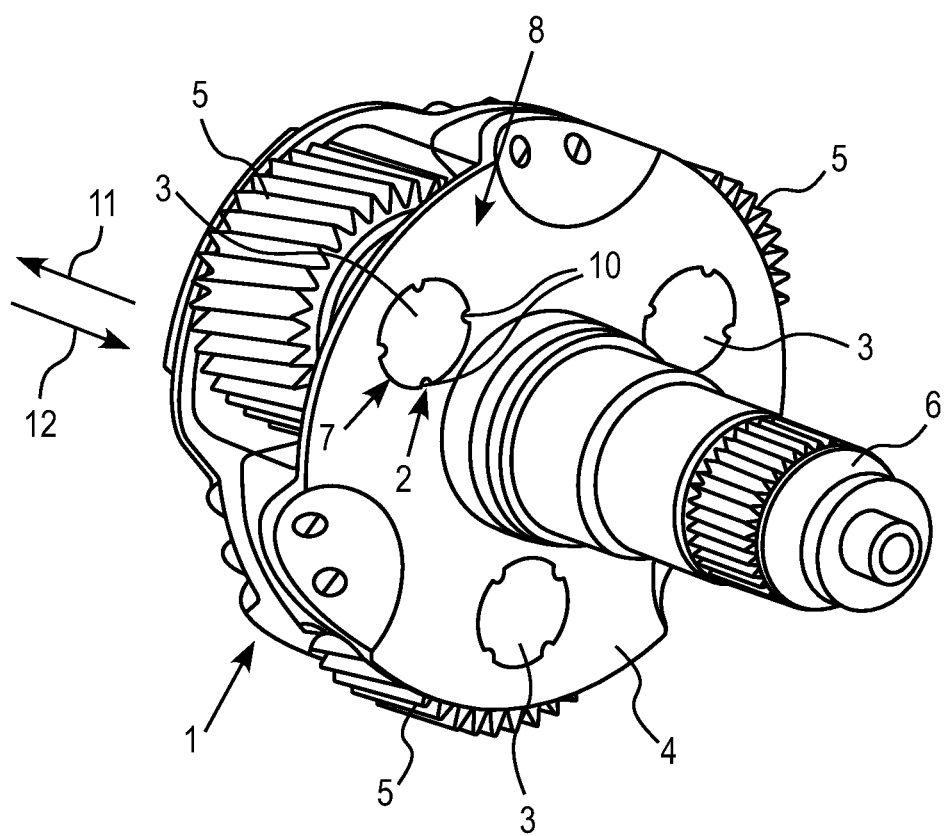
FIG. 1 shows a schematic perspective view of a planetary gear set, having an assembly of a first component designed as an axle on a second component, wherein the first component is secured on the second component in the axial direction of the first component by respective deformations which are arranged on the same side.

FIG. 1 shows, in a schematic and perspective rear view, a planetary gear set which is denoted overall by 1 and which is also referred as a planetary gearing. The planetary gear set 1 is used, of example, in a drive train of a vehicle which is designed as a motor vehicle and is designed, for example, as an automobile, in particular as a passenger vehicle, and is drivable by means of the drive train. The planetary gear set 1 has an assembly 2 of a first component 3 on a second component 4 of the planetary gear set 1. The second component 4 is designed here as a planetary carrier of the planetary gear set 1, wherein the planetary carrier is also referred to as a web. In the exemplary embodiment illustrated in FIG. 1, the first component 3 is designed as an axle and, in particular, as a bolt on which at least one planetary gear 5 of the planetary gear set 1 is rotatably mounted. In particular, the planetary gear set 1 comprises a plurality of first components 3 on which respective planetary gears 5 of the planetary gear set 1 are rotatably mounted.

The planetary gear set 1 comprises, for example, a sun gear (which cannot be seen in FIG. 1) which, for example, is in engagement with the planetary gears 5. At least one ring gear, not shown in FIG. 1, with which the planetary gears 5 mesh, can be provided here. The planetary carrier is connected to a shaft 6 for rotation therewith, and therefore, for example, torques can be transmitted between the shaft 6 and the planetary carrier (second component 4). Therefore, for example, torques for driving the planetary gear set 1 can be introduced via the shaft 6 in to the planetary carrier and therefore in to the planetary gear set 1 as a whole. Alternatively or additionally, it is contemplated for the planetary carrier or the planetary gear set 1 to be able to provide torques via the shaft 6.

It can furthermore be seen from FIG. 1 that the second component 4 has a receptacle 7 which is designed, for example, as a through-opening and in which at least one length region of the first component 3 is arranged. As will be explained more precisely below, in the assembly 2, the respective first component 3 is secured on the second component 4 at least in the axial direction of the first component 3, and therefore relative displacements between the components 3 and 4 in the axial direction of the first component 3 are avoided. The planetary gear 5 is rotatable here about an axis of rotation relative to the second component 4 and in particular relative to the first component 3, wherein said axis of rotation coincides with the axial direction of the first component 3.

In order now to be able to produce the planetary gear set 1 particularly simply and therefore rapidly and cost-effectively, the first component 3 has, on one axial side 8, two first deformations 9 by means of which the first component 3 is secured on the second component 4 in a first direction which coincides with the axial direction of the first component 3 or runs parallel to the axial direction of the first component 3. Relative displacements between the components 3 and 4 in the first direction is therefore avoided by means of the deformations 9.

In addition, it is provided in the assembly 2 that the second component 4 has, on the same side 8, two second deformations 10 by means of which the first component 3 is secured on the second component 4 in a second direction which coincides with the axial direction of the first component 3 or runs parallel to the axial direction of the first component 3 and is opposed to the first direction. Relative displacements between the components 3 and 4 in the second direction, which is opposed to the first direction, are therefore avoided by means of the deformations 10. The first direction is, for example, illustrated by an arrow 11 in FIG. 1, with the second direction being illustrated, for example, by an arrow 12 in FIG. 1. Since the deformations 9 and 10 are arranged on the same side 8, the deformations 9 and 10 can be produced particularly simply and therefore rapidly and cost-effectively. The side 8 here is an axial side which faces in the axial direction of the component 3.

The respective first deformation 9 is formed by the fact that the first component 3 is deformed in a respective first region or at a respective first location. The respective second deformation 10 is formed by the fact that the second component 4 is deformed at a respective second location or in a respective second region. A respective partial region of the respective component 3 or 4 is therefore deformed by the respective deformation 9 or 10. For example, the component 4 here has a respective first recess which corresponds to the respective deformation 9 and in which the respective deformation 9 or the respective partial region of the component 3 that is deformed forming the respective deformation 9 is at least partially, in particular at least predominantly or completely, accommodated. In a manner corresponding thereto, for example, the respective component 3 has a respective second recess in which the respective second deformation 10 or the respective partial region of the component 4 forming the respective second deformation 10 is at least partially, in particular at least predominantly or completely, accommodated. By means of said respective at least partial accommodation of the respective deformed partial region in the respective corresponding recess, the components 3 and 4 interact, for example, at least in a form-fitting manner, as a result of which the components 3 and 4 are secured on each other both in the first direction and in the second direction.

The first direction and the second direction are therefore what are referred to as securing directions in which the components 3 and 4 are fixed or secured on each other. In the exemplary embodiment illustrated in FIG. 1, two deformations 9 or 10 are provided per securing direction, said deformations being able to be arranged, for example, opposite each other in the circumferential direction of the first component 3 or on a circular circumference, in particular opposite each other by 180 degrees, or next to each other, in particular next to each other by 90 degrees. In the exemplary embodiment illustrated in FIG. 1, the first deformations 9 are arranged spaced apart from each other by 90 degrees or 270 degrees, with the second deformations 10 also being arranged spaced apart from each other by 90 degrees or 270 degrees. Alternatively thereto, it is contemplated for the deformations 9 and 10 to be arranged spaced apart from one another by 180 degrees in each case with respect to the circumferential direction of the first component 3. The deformations 9 and 10 are preferably arranged overall distributed uniformly in the circumferential direction of the component 3, in particular over the circumference thereof. In particular, it is contemplated to provide as many deformations 9 or 10 as desired and, for example, to divide up or to distribute them irregularly in the circumferential direction of the component 3.

The deformations 9 and 10, since they are arranged on the same side 8, can be produced particularly simply and cost-effectively by means of a device and in particular by means of precisely one actuator, wherein the actuator can be designed, for example, as a hydraulic cylinder or as a pneumatic cylinder. Overall, the planetary gear set 1 and therefore the drive train or the vehicle overall can therefore be produced particularly simply and cost-effectively.

Figure 2:
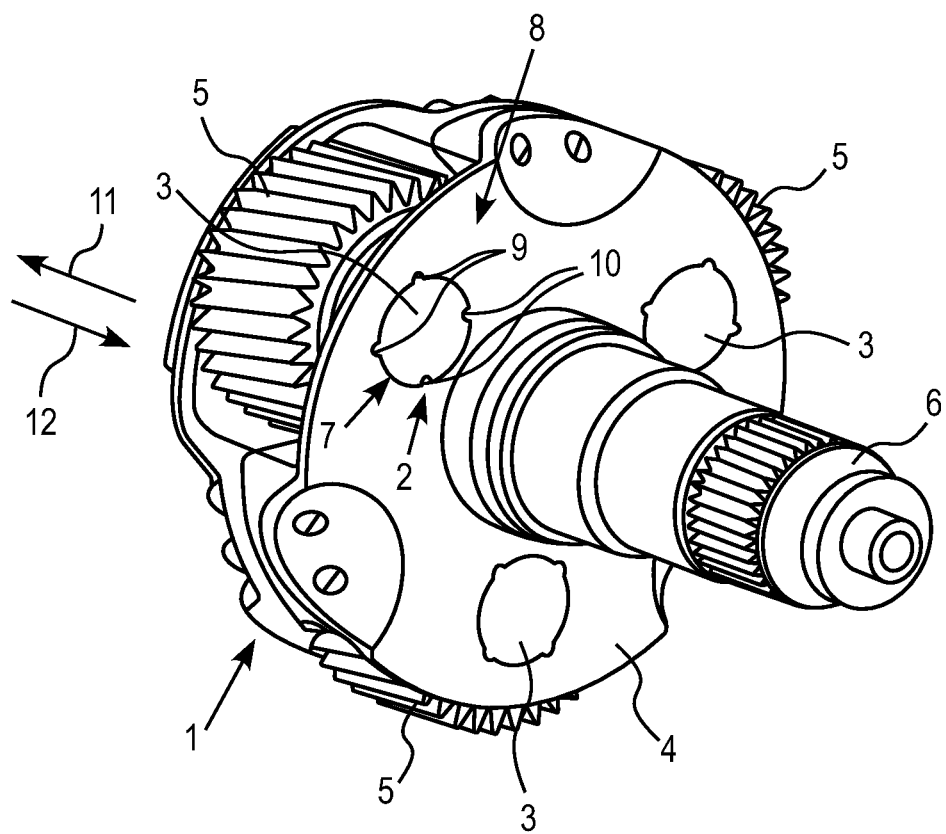
FIG. 2 shows another schematic perspective view of a planetary gear set.

As shown in FIG. 2, the at least one first deformation 9 and the at least one second deformation 10 are on the second component 4.

LIST OF REFERENCE SIGNS

1 Planetary gear set
2 Assembly
3 First component
4 Second component
5 Planetary gear
6 Shaft
7 Receptacle
8 Side
9 First deformation
10 Second deformation
11 Arrow
12 Arrow The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An assembly, comprising: a first component configured as a region of an axle or shaft; a second component on which the first component is assembled, wherein the first component is secured on the second component at least in an axial direction of the first component; at least one of the first and second components has, on one side, at least one first deformation by which the first component is secured on the second component in a first direction, which coincides with and is opposite to the axial direction; and at least one of the first and second components has, on the same side, at least one second deformation by which the first component is secured on the second component in a second direction which coincides with the axial direction and is opposed to the first direction, wherein the at least one first deformation is a plurality of deformations that are located on the first component and that are distributed uniformly in the circumferential direction of the first component, the at least one second deformation is a plurality of deformations that are located on the second component and that are distributed uniformly in the circumferential direction of the second component, and the respective first and second plurality of deformations are all located in different circumferential positions around the first component.

2. The assembly according to claim 1, wherein the plurality of first deformations are arranged consecutively in the circumferential direction of the first component.

3. The assembly according to claim 2, wherein the second deformations are arranged consecutively in the circumferential direction of the first component.

4. The assembly according to claim 1, wherein the first component is an axle on which a planetary gear of a planetary gearing is rotatably mounted.

5. The assembly according to claim 4, wherein the second component is a planetary carrier of the planetary gearing.

6. A vehicle comprising: an assembly including: a first component configured as a region of an axle or shaft; a second component on which the first component is assembled, wherein the first component is secured on the second component at least in an axial direction of the first component; at least one of the first and second components has, on one side, at least one first deformation by which the first component is secured on the second component in a first direction, which coincides with and is opposite to the axial direction; and at least one of the first and second components has, on the same side, at least one second deformation by which the first component is secured on the second component in a second direction which coincides with the axial direction and is opposed to the first direction, wherein the at least one first deformation is a plurality of deformations that are located on the first component and that are distributed uniformly in the circumferential direction of the first component, the at least one second deformation is a plurality of deformations that are located on the second component and that are distributed uniformly in the circumferential direction of the second component, and the respective first and second plurality of deformations are all located in different circumferential positions around the first component.

\* \* \* \* \*